United States Patent Office 2,988,910
Patented June 20, 1961

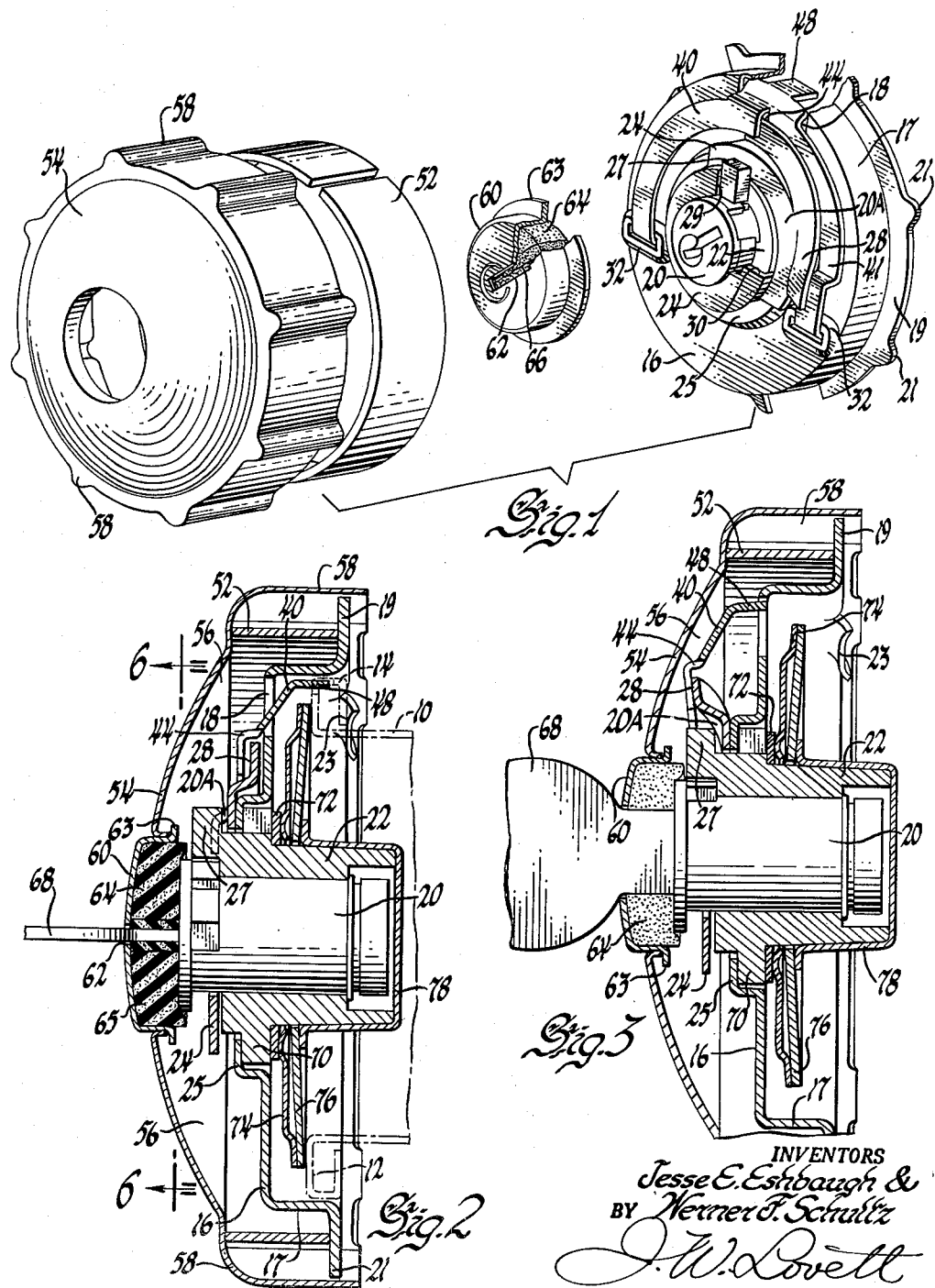

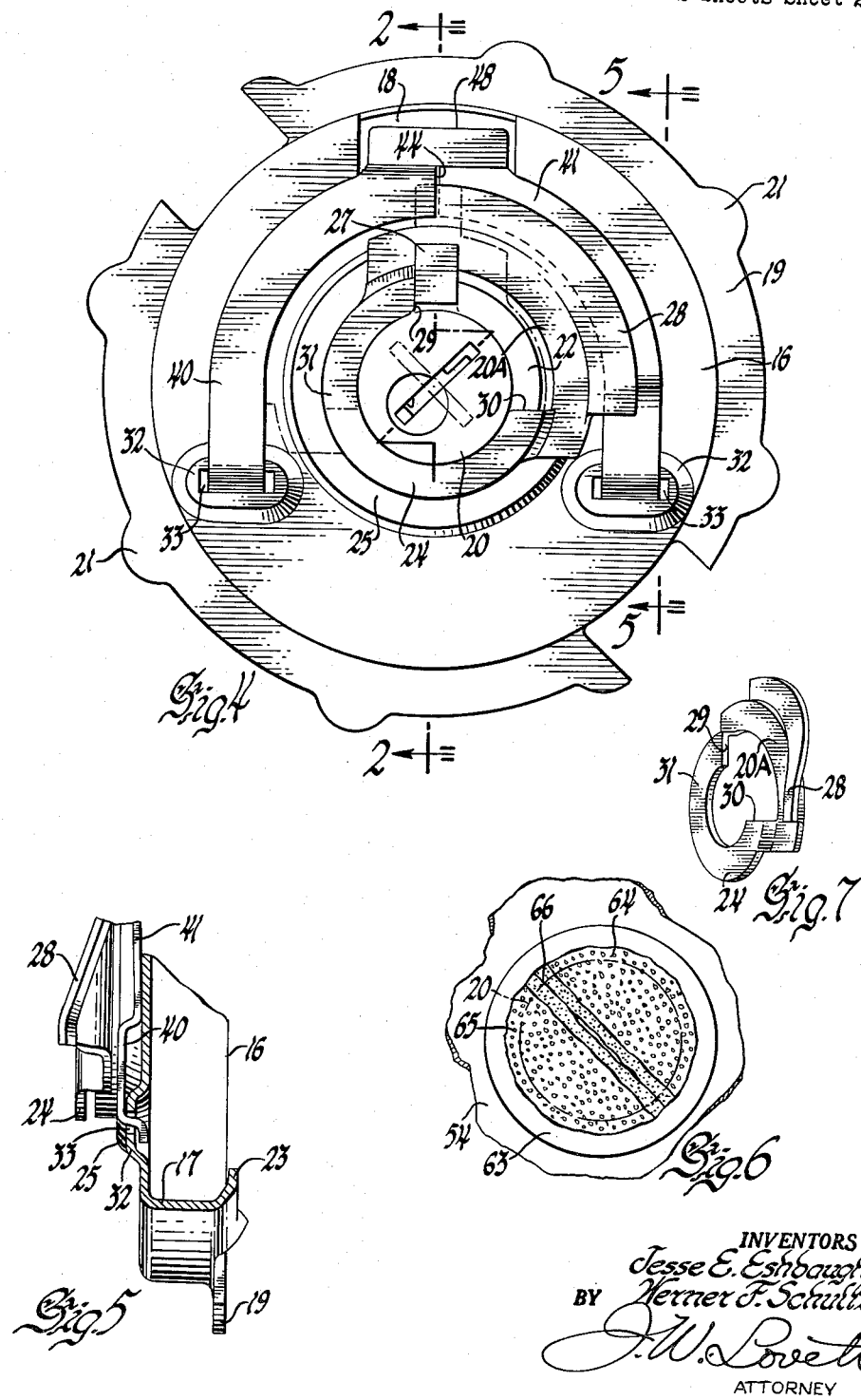

2,988,910
LOCKING CAP FOR A FILLER PIPE
Jesse E. Eshbaugh and Werner F. Schultz, Flint, Mich., assignors to General Motors Corporation, Detroit, Mich., a corporation of Delaware
Filed Apr. 12, 1957, Ser. No. 652,609
2 Claims. (Cl. 70—173)

This invention relates to a closure and more particularly to a locking type cap for a filler pipe on a receptacle such as a vehicle gasoline tank.

It is desirable in providing a locking cap for a filler pipe that the cap be so designed as firmly to be seated on the filler pipe to seal the same and, at the same time, be such as to be capable of being locked or unlocked with the exertion of merely a light turning pressure on a key. Such a cap structure should also be rugged in construction with a minimum of parts and be economical to manufacture.

An object of the present invention is to provide an improved locking cap of rugged and inexpensive construction and characterized by ease of operation insofar as locking and unlocking are concerned.

To this end, a feature of the invention pertains to a cam plate arranged to operate an oscillatable member having a locking portion extending and movable in the direction of the cap axis.

These and other important features of the invention will now be described in detail in the specification and then pointed out more particularly in the appended claims.

In the drawings:

FIG. 1 is an exploded and perspective view of a closure cap in which the present invention is embodied;

FIG. 2 is a sectional view taken along the line 2—2 in FIG. 4, the cap having its parts in their positions assumed for locking it on a filler neck;

FIG. 3 is a view similar to that of FIG. 2 but with the parts in their unlocked positions;

FIG. 4 is an enlarged view of an assembly shown in FIG. 1;

FIG. 5 is a sectional view looking in the direction of the arrows 5—5 in FIG. 4;

FIG. 6 is a sectional view of a key slot seal looking in the direction of the arrows 6—6 in FIG. 2; and FIG. 7 is a perspective view of a part used in the assembly of FIG. 1.

The end of a filler pipe 10 is shown in dot-and-dash lines in FIG. 2. This pipe is provided with an out-turned flange 12 having a notch 14 in its periphery. This notch is employed in utilizing the cap to lock the latter in non-rotative position when placed against the end of the pipe 10 for sealing the same.

The cap, as disclosed in the drawings and embodying the present invention, includes a main frame 16 formed with a cylindrical portion 17 and an out-turned peripheral flange 19. This flange bears spaced, outwardly extending tabs 21 and two oppositely disposed and inwardly extending tongues 23 formed from the material of the flange. These tongues are adapted to engage cam surfaces on the filler pipe flange 12 so that upon turning of the cap with relation to the pipe 10, the cap is cammed into closed position on the pipe or is released therefrom depending on the direction of rotation. This manner of attaching the cap to the pipe is conventional. The notch 14 may constitute an inlet passage for one of the tongues 23 and a similar opposite notch is, of course, supplied on the flange 12 to receive the other tongue.

The frame 16 has an annular raised portion 25 centrally apertured to receive a central lock cylinder 20 and a cylindrical barrel 22 coaxial with the cylinder. The lock cylinder 20 is of conventional construction and may be released from its locked position with relation to the barrel 22, as shown positioned in FIGS. 1 and 2, by turning of a key in the lock cylinder in counterclockwise direction. The barrel 22 is provided with a radially extending lug 27 integral therewith. The inner end of this lug is free of the lock cylinder 20 and extends from near that cylinder and overlaps an arcuate marginal flat portion 20A of a cam plate 24. This portion lies in a plane normal to the axis of the cap and almost flush with one end surface of the barrel 22. The cam plate 24 bears an arcuate opening determined by two shoulders 29 and 30 and through which the lug 27 extends. A portion 31 of the cam plate closely surrounds the lock cylinder 20 for almost 270 degrees (from shoulder 29 to shoulder 30) and is fixed to the cylinder to rotate therewith. An outer peripheral and arcuate portion of the cam plate 24 is formed with an outer cam surface 28 and which is helical in contour.

The frame 16 has two small raised portions 32 which are apertured as at 33 to receive the ends of a U-shaped locking member 40. The latter extends around one side of the lock cylinder 20 and has a depressed arcuate portion 41 with one end thereof cooperating with another arcuate portion to define a slot 44. The locking member 40 also bears a locking portion 48 in the form of a tab extending along the direction of the cap axis and through an opening 18 in the frame 16. The arrangement is such that the locking member 40 is free to oscillate with respect to the frame 16 if it were not restricted by the cam plate 24 which extends into the slot 44.

Surrounding the frame 16 is a ring member 52 and this member is of such width as properly to space a cover 54 from the flange 19 in the axial direction. The cover defines an annular chamber 56 enclosing the ring 52, frame 16, cam plate 24 and other parts in an attractive manner. The periphery of the cover is formed with projecting channel portions 58 for receiving the tabs 21. The tabs, therefore, prevent relative rotation of the frame and cover. Relative axial motion between the frame and cover may be prevented by suitably crimping the edges of the cover over the frame. The cover 54 is centrally apertured to receive a cup member 60. The latter bears a key slot 62 and an outer flange 63. The cup member 60 is filled with two semi-circular pieces 64 and 65 of sponge rubber which cooperate to define a slit 66 through which a key 68 may be inserted. If desired, portions of the rubber pieces 64 and 65 may be of a different composition more resistant to abrasion at the areas of contact with the key as depicted in FIG. 6 of the drawings. The flange 63 retains the cup 60 from outward displacement and the rubber pieces 64 and 65 abut the outer end of the lock cylinder 20 preventing inward displacement of the cup member 60. Because of the rubber pieces, the cap is effectively sealed against admission of dirt and moisture while permitting insertion and withdrawal of the key.

The barrel 22 has an integral, annular shoulder portion 70 which is fixed to the annular raised portion 25 of the frame 17 so that no relative rotation may take place between the barrel and the frame. Abutting the shoulder portion 70 is a resilient washer 72 against which bears an inner margin of a resilient metal disk 74. Coextensive with the latter is a fibrous sealing disk 76 which is retained in place by means of a cup 78 forced over the inner end of the barrel 22. The cup 78 seals the lock cylinder from the filler pipe with which the cap is to be engaged. The disks 74 and 76 are of such diameters as resiliently to engage the end of the filler pipe 10 to seal or close the same as will be explained.

In applying the cap to the filler pipe, the lock cylinder 20 must first be turned counterclockwise with a key. This will cause the cam plate 24 to rotate until the shoulder 30 engages the lug 27. Because of this rotation, the U-shaped locking member 40 will be swung into its position, as depicted in FIG. 3, and the locking portion 48 will be withdrawn at least partially from the opening 18 in the frame 16. As a consequence, the entire cap may then be applied to the pipe flange 12 and be rotated to bring the tongues 23 into operation. The disks 74 and 76 will flex and a tight closure of the pipe 10 is effected. For locking the cap, the key 68 is then turned in a clockwise direction until the shoulder 29 of the cam plate strikes the lug 27. Because of this action, the cam plate 24 will cause the locking portion 48 to move to the right from its unlocked position, as viewed in FIG. 3, to its locking position, as viewed in FIGS. 1 and 2. In the latter position the locking portion 48 will have engaged the notch 14 and the cap cannot be rotated or removed from the pipe 10.

In unlocking or locking the cap on the pipe, the key 68 is turned to move the portion 48 from or into the pipe notch 14 through the action of the cam plate 24 on the locking member 40. It will be noted that only a slight force need be exerted to turn the key 68 in either direction as the locking is entirely independent of the turning movement needed for effecting or releasing the sealing pressure against the sealing disk 76.

We claim:

1. A cap including a main frame with an opening therein, a locking cylinder releasably arranged for rotation on and with respect to said frame, a cam plate fixed to said cylinder at one side of said frame and having an arcuate cam surface inclined toward said one side, a U-shaped locking member having both ends pivoted to said main frame and having an intermediate locking portion extending through said opening, said cam surface being arranged to engage said locking member to move said locking portion in said opening in a direction parallel with the axis of said locking cylinder, and means for holding the cap in closed relation with the end of a filler pipe.

2. A cap for a filler pipe provided with an out-turned flange having a notch therein, said cap including a main frame with an opening therein intermediate the axis and the periphery of the cap, a barrel fixed to said frame, a locking cylinder and cam plate arranged to rotate together on and with relation to said frame, said locking cylinder extending within and being releasable for rotation with respect to said barrel, said cam plate being at one side of said frame and having a curved contour portion inclined toward said frame in the direction of said axis, a U-shaped locking member partially surrounding said barrel at said side of said frame and having both ends pivoted to the latter, a locking portion extending into said opening and also integral with said locking member and spaced from said ends, a slot in said locking member, said curved contour portion extending through said slot, a cover enclosing said locking member but revealing said locking cylinder and non-rotatively fixed to said frame, means releasably holding said frame to said pipe by relative rotation of the frame with respect to the pipe, and the arrangement being such that rotation of said locking cylinder adapts said curved contour portion to act on said locking member and actuate said locking portion into and out from said notch when said cap is in closed position on said flange.

References Cited in the file of this patent

UNITED STATES PATENTS

| | | |
|---|---|---|
| 2,070,692 | Stone | Feb. 16, 1937 |
| 2,124,035 | Hurd | July 19, 1938 |
| 2,681,559 | Friend | June 22, 1954 |
| 2,747,763 | Sach | May 29, 1956 |
| 2,893,233 | Schultz | July 7, 1959 |